Patented Nov. 1, 1932

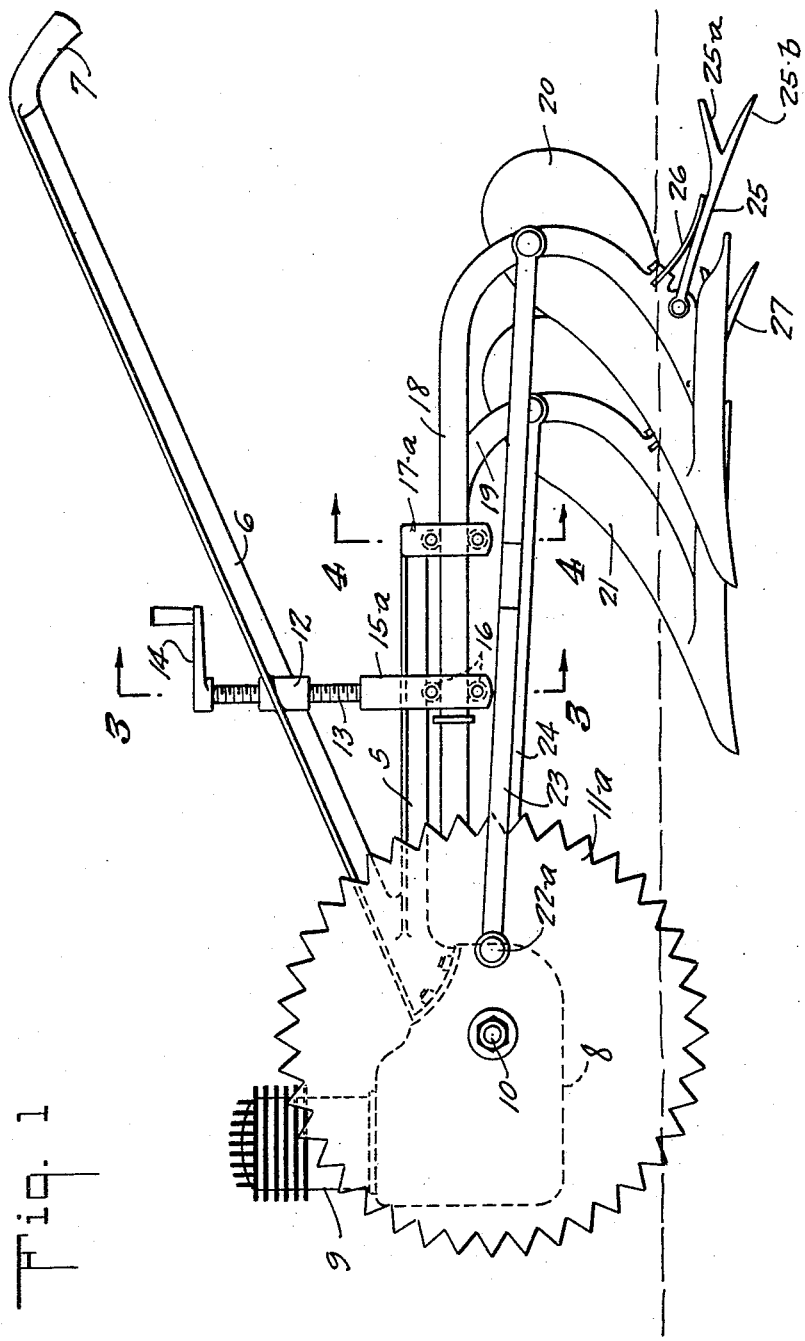

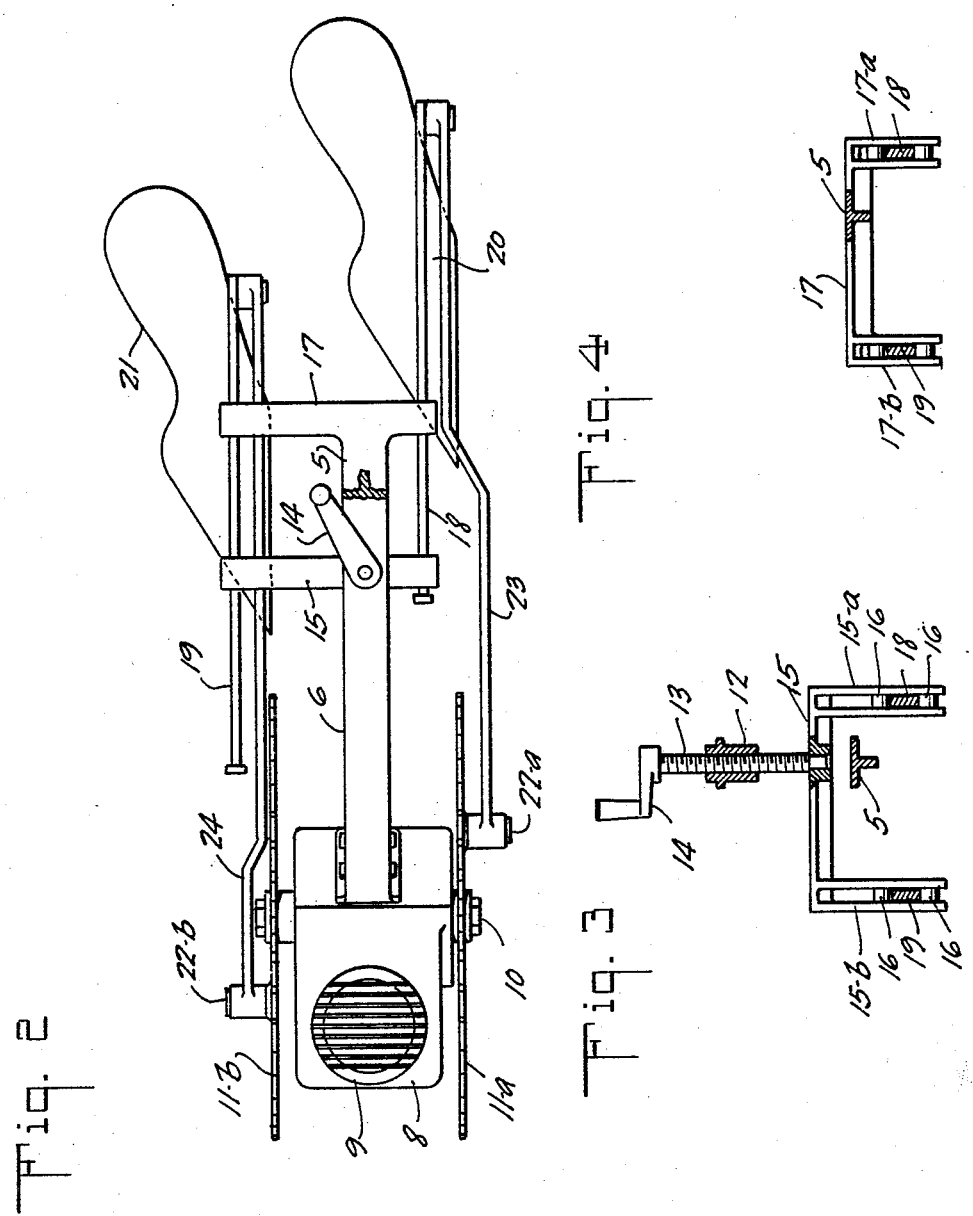

1,886,005

UNITED STATES PATENT OFFICE

HAROLD H. GLASIER, OF LOS ANGELES, CALIFORNIA

POWER PLOW

Application filed November 12, 1931. Serial No. 574,518.

This invention relates to a soil tilling implement having ground tools reciprocating in the direction of the ground level and provided with steppers to urge the implement forwardly. The primary object of this invention is to provide such an implement having steppers tracking in the soil disturbed by the tools. A further object of this invention is to provide a self-propelled implement of the character described having traction wheels incising the ground in front of the plow points. Other objects of the invention are to provide details of structure whereby a simple efficient implement economical to manufacture is obtained.

These objects are obtained by means of the embodiment of the invention illustrated in the accompanying drawings, in which:

Fig. 1 is a side elevation of a plow constructed in accordance with my invention; Fig. 2 is a plan view; and Figs. 3 and 4 are sections as seen on the lines correspondingly numbered in Fig. 1.

Referring more particularly to the drawings, a frame comprises a plow supporting bar 5 and a handle shank 6 formed in one casting and diverging from one another. The handle shank is provided with handles 7 for guiding the implement. At the front end of the frame is a base 8 providing a crank case for an engine and to which the casting is secured by means of bolts. The crank case may contain gearing operated from a motor 9 which is indicated conventionally. A driven shaft 10 carries serrated discs 11a and 11b forming traction wheels for the plow and also incising the ground.

On the bar 6 is a boss having a threaded bore to receive an adjustment screw 13 provided with a handle 14. The adjustment screw carries a yoke 15 with slide ways in the legs 15a and 15b. There are spaced rollers 16 in the legs. At the rear of the bar 5 is a yoke 17 having legs 17a and 17b forming slide ways and provided with rollers.

Beams 18 and 19 are mounted between the rollers in the slide ways and guide plow shares 20 and 21 in their reciprocation. The plow shares are provided with points which are aligned with the serrated wheels so as to follow in the incisions formed by the wheels. On the discs 11a and 11b are crank pins 22a and 22b. A connecting rod 23 is pivotally secured to a pin on the beam 18 and journalled at its other end on the pin 22a. A connecting rod 24 likewise connects a pin on the beam 19 and pin 22b. Pivotally secured to the beam 22 adjacent the juncture of the beam and the plow share is a stepper 25 which has a foot with a diverging heel 25a and toe 25b. A leaf spring 26 tends to hold the stepper in a lower position. There is a similar stepper and leaf spring indicated by 27 on the plow beam 19. The crank pins 22a and 22b are disposed diametrically opposite.

In the operation of the implement, the motor rotates the serrated wheels producing a tractive effort for drawing the plows and the rotation of the wheels causes reciprocation of the plow shares in opposite directions. As one plow share moves forward breaking the ground, the other moves rearwardly with respect to the frame of the machine. The stepper on the plow moving forwardly tracks through the loose soil and offers little impedance to the movement of its plow. The stepper on the other plow moving rearwardly exerts a thrust against the ground so that it urges the implement forwardly. Thus, the plows and steppers perform a double function, that of breaking the soil by reciprocation with respect to the frame. Continuous forward movement due to the advance of the implement is aided by reason of the steppers. The depth of penetration of the plow shares may be regulated by means of the screw 13, as is obvious.

What I claim is:

1. A tilling implement comprising a frame, a reciprocating ground working tool mounted on said frame for advance through the soil, a stepper advanceable and retractable with said tool and upon retraction thrusting against the soil to urge said implement forwardly, and means to simultaneously reciprocate said tool and stepper.

2. A tilling implement comprising a frame, a reciprocating ground working tool mounted on said frame for advance through the soil, a stepper connected to said tool to be advanceable and retractable therewith and upon retraction thrusting against the soil to urge said implement forwardly, and means to reciprocate said tool.

3. A tilling implement comprising a frame, a pair of reciprocating ground working tools mounted on said frame for advance through the soil, steppers advanceable and retractable with said tools and upon retraction thrusting against the soil to urge said implement forwardly, and means to simultaneously reciprocate a companion tool and stepper and to alternately reciprocate said companions.

4. A tilling implement comprising a frame, a pair of reciprocating ground working tools mounted on said frame for advance through the soil, steppers connected to said tools to be advanceable and retractable therewith and upon retraction thrusting against the soil to urge said implement forwardly, and means to simultaneously reciprocate a companion tool and stepper and to alternately reciprocate said companions.

5. A tilling implement comprising a frame, a pair of reciprocating ground working tools mounted on said frame for advance through the soil, steppers pivotally connected to said tools to be advanceable and retractable therewith, said steppers having rearwardly diverging toes and heels thrusting against the soil upon retraction to urge said implement forwardly, and means to simultaneously reciprocate a companion tool and stepper and to alternately reciprocate said companions.

6. A self-propelled tilling implement comprising a frame, traction wheels at the front thereof, plows mounted on said frame for horizontal reciprocation, connecting rods secured to said wheels at diametrically opposite positions and secured to said plows to reciprocate the latter in alternate directions, steppers secured to the plows to thrust against the ground when the plows are moved rearwardly and thereby urge the implement forwardly, and a motor to rotate said wheels.

7. A self-propelled tilling implement comprising a frame, traction wheels at the front thereof, plows mounted on said frame for horizontal reciprocation, connecting rods secured to said wheels at diametrically opposite positions and secured to said plows to reciprocate the latter in alternate directions, steppers pivotally secured to the plows and having feet with rearwardly diverging toes and heels to thrust against the ground when the plows are moved rearwardly and thereby urge the implement forwardly, and a motor to rotate said wheels.

8. A self-propelled tilling implement comprising a frame, serrated traction wheels at the front thereof, plows mounted on said frame for horizontal reciprocation, the plow points being disposed to track the incisions made by said wheels, connecting rods secured to said wheels at diametrically opposite positions and secured to said plows to reciprocate the latter in alternate directions, steppers secured to the plows and having feet to thrust against the ground when the plows are moved rearwardly and thereby urge the implement forwardly, and a motor to rotate said wheels.

9. A self-propelled tilling implement comprising a frame, serrated traction wheels at the front thereof, plows mounted on said frame for horizontal reciprocation, the plow points being disposed to track the incisions made by said wheels, connecting rods secured to said wheels at diametrically opposite positions and secured to said plows to reciprocate the latter in alternate directions, steppers pivotally secured to the plows and having feet with rearwardly diverging toes and heels to thrust against the ground when the plows are moved rearwardly and thereby urge the implement forwardly, and a motor to rotate said wheels.

10. A self-propelled tilling implement comprising a frame, serrated traction wheels at the front thereof, plows mounted on said frame for horizontal reciprocation, the plow points being disposed to track the incisions made by said wheels, connecting rods secured to said wheels at diametrically opposite positions and secured to said plows to reciprocate the latter in alternate directions, steppers pivotally secured to the plows and having feet with rearwardly diverging toes and heels to thrust against the ground when the plows are moved rearwardly and thereby urge the implement forwardly, resilient means tending to hold said steppers in the ground, and a motor to rotate said wheels.

In witness that I claim the foregoing I have hereunto subscribed my name this 2nd day of November, 1931.

HAROLD H. GLASIER.